United States Patent
Wurzburg

(10) Patent No.: US 7,210,619 B2
(45) Date of Patent: May 1, 2007

(54) SYSTEMS AND METHODS FOR POWER REDUCTION IN SYSTEMS HAVING REMOVABLE MEDIA DEVICES

(75) Inventor: Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 11/359,033

(22) Filed: Feb. 21, 2006

(65) Prior Publication Data

US 2006/0138230 A1 Jun. 29, 2006

Related U.S. Application Data

(63) Continuation of application No. 10/762,684, filed on Jan. 20, 2004, now Pat. No. 7,086,583.

(51) Int. Cl.
*G06F 17/00* (2006.01)
(52) U.S. Cl. .................... 235/375; 235/382.5
(58) Field of Classification Search ........ 235/375, 235/380, 382, 382.5, 439, 441, 492; 713/300, 713/320, 321–324
See application file for complete search history.

(56) References Cited

U.S. PATENT DOCUMENTS

| 5,541,985 | A | 7/1996 | Ishii et al. |
| 5,793,359 | A | 8/1998 | Ushikubo |
| 5,877,483 | A | 3/1999 | Bilich et al. |
| 5,953,511 | A | 9/1999 | Sescila, III et al. |
| 6,279,060 | B1 | 8/2001 | Luke et al. |
| 6,317,839 | B1 | 11/2001 | Wells |
| 6,389,544 | B1 | 5/2002 | Katagiri |
| 6,435,904 | B1 | 8/2002 | Herbst et al. |
| 6,460,143 | B1 | 10/2002 | Howard et al. |
| 6,467,042 | B1 | 10/2002 | Wright et al. |
| 6,505,267 | B2 | 1/2003 | Luke et al. |
| 6,510,524 | B1 | 1/2003 | Osborn et al. |
| 6,519,669 | B1 | 2/2003 | Yanagisawa |
| 6,601,180 | B1 | 7/2003 | Paredes et al. |
| 2004/0163003 | A1 | 8/2004 | Dutton et al. |
| 2005/0156038 | A1 | 7/2005 | Wurzburg et al. |

FOREIGN PATENT DOCUMENTS

JP  408050643 A  2/1996

*Primary Examiner*—Lisa Caputo
(74) *Attorney, Agent, or Firm*—Meyertons Hood Kivlin Kowert & Goetzel, P.C.; Jeffrey C. Hood

(57) ABSTRACT

In some embodiments, if a card in a card reader has not been accessed in a first specified amount of time, the card may be powered down. The card may be powered back up if an attempt is made to access the card. In some embodiments, if a memory card is in the memory card slot of the card reader, but has not been accessed in a second specified amount of time, the card reader may be electrically disconnected from the host controller if a sideband signal is available to signal the card reader when to electrically reconnect.

20 Claims, 10 Drawing Sheets

SYSTEMS AND METHODS FOR POWER REDUCTION IN SYSTEMS HAVING REMOVABLE MEDIA DEVICES

PRIORITY

This application is a continuation of U.S. patent application Ser. No. 10/762,684 titled "Systems and Methods for Power Reduction in Systems Having Removable Media Devices" filed Jan. 20, 2004 now U.S. Pat. No. 7,086,583, whose inventor is Henry Wurzburg.

BACKGROUND OF THE INVENTION

1. Field of the Invention

This invention relates generally to the field of computer systems and, more particularly, to peripheral devices.

2. Description of the Related Art

The Universal Serial Bus (USB) allows coupling of peripheral devices to a computer system. USB is a serial cable bus for data exchange between a host computer and a wide range of simultaneously accessible devices. The bus allows peripherals to be attached, configured, used, and detached while the host is in operation. For example, a card reader for reading flash memory cards may be coupled to a host computer through the USB. USB based systems may require that a USB host controller be present in the host system, and that the operating system (OS) of the host system support USB and USB Mass Storage Class Devices. A USB hub may be coupled to a USB host controller to allow multiple USB devices to be coupled to the host system through the USB host controller. In addition, other USB hubs may be coupled to the USB hub to provide additional USB device connections to the USB host controller.

In recent years the electronics marketplace has seen a proliferation of appliances and personal electronics devices that use solid-state memory. For example, traditional film cameras have been losing market share to digital cameras capable of recording images that may be directly downloaded to and stored on personal computers (PCs). The pictures recorded by digital cameras can easily be converted to common graphics file formats such as Joint Photographic Experts Group (JPEG), Graphic Interchange Format (GIF) or Bitmap (BMP), and sent as e-mail attachments or posted on web pages and online photo albums. Many digital cameras are also capable of capturing short video clips in standard digital video formats, for example Moving Picture Experts Group (MPEG), which may also be directly downloaded and stored on personal computers (PCs) or notebook computers. Other devices that typically use solid-state memory include personal digital assistants (PDAs), pocket PCs, video game consoles and Moving Picture Experts Group Layer-3 Audio (MP3) players.

The most widely used solid-state memory devices include flash-memory chips configured on a small removable memory card, and are commonly referred to as flash-memory cards. The majority of flash-memory cards currently on the market are typically one of: Compact Flash™, MultiMediaMemory™ memory card (MMC) and the related Secure Digital Memory card (SD), SmartMedia™ memory card (SM), xD Picture CardS™ (xD), and Memory Stick™. Most digital cameras, for example, use Compact Flash™ memory cards to record images. Many PDA models use Memory Stick™ memory cards to hold data. Some MP3 players store music files on SM memory cards. Generally, data saved by PDAs and other handheld devices using flash-memory cards are also transferred or downloaded to a PC. In the present application, the term "flash-memory" is intended to have the full breadth of its ordinary meaning, which generally encompasses various types of non-volatile solid-state memory devices as described above.

Typically, a flash-memory card can easily be removed from the utilizing device. For example, a Compact Flash™ memory card can be removed from a digital camera much like film is removed from a standard camera. The flash-memory card can then be inserted into an appropriate flash-memory card reader coupled to a PC, and the image files directly copied to the PC. It should be noted that while a majority of smaller hand-held computers and PDAs have slots that receive Compact Flash™ memory cards, currently, most PCs do not, hence the need for a flash-memory card reader connecting to the PC. Most recently the preferred interface between flash-memory card readers and PCs has been the Universal Serial Bus, where the flash-memory card reader is connected to a USB port on the PC via a USB cable. Portable computer or notebook PCs typically also have PC-memory card (earlier known as Personal Computer Memory card International Association; PCMCIA) slots that, can receive PCMCIA memory cards configured as flash-memory card readers.

In all, the many different memory card formats present a wide array of interface requirements not only for PCs but for other digital systems as well, such as embedded systems. Different adapters are needed for each of the memory card formats. One solution to consolidate the interfacing of flash-memory cards to desktop and portable computer PCs has been the design and manufacture of multi-format flash-memory card readers that are capable of reading the most popular formats. Such memory card-readers are sometimes referred to as 'Seven-in-one' readers indicating that they may be used with the currently popular flash-memory card formats. As indicated above, such multi-format card readers are typically designed with a USB interface.

While USB devices, such as multi-format card readers and USB hubs designed with a USB interface, are typically connected to host PCs and/or notebook PCs via a USB cable, they may also be designed into computers as embedded USB devices. Typically, adding an embedded USB device, such as a card reader or hub, to a computer adversely affects power consumption of the computer. In general, a USB device attached to the USB host controller of the computer may prevent the central processing unit (CPU) of the computer from entering a low power state—e.g., the C3 state. The USB host controller, as a bus mastering peripheral, may keep the PCI bus active as long as it is attached to a USB device preventing the CPU from going into a low power state. This may especially be a problem for embedded devices (e.g., an embedded card reader). Unnecessary power may also be used to power a memory card that is not in use. When a memory card or multiple memory cards are inserted in a memory card-reader, they are normally fully powered as long as the memory card-reader is not in SUSPEND mode. In such case, the memory card can typically dissipate up to 100 mA, adversely affecting battery life.

SUMMARY OF THE INVENTION

In various embodiments, a USB device (e.g., a USB hub or card reader) coupled to a USB host controller may communicate with the USB host controller through an upstream port. In some embodiments, a USB hub may be coupled to a USB port to provide additional USB ports. Data may be transmitted from the USB device to the USB host controller and then used by a central processing unit (CPU).

In some embodiments, if the USB device is turned off or is not in an active state (e.g., no cards are present in a USB card reader or no devices are attached to a USB hub), an algorithm (e.g., from the device's firmware) may be implemented to electrically disconnect the USB device from the USB host controller. In some embodiments, when the USB device is electrically disconnected from the USB host controller and no system activity from a bus mastering peripheral is occurring on the PCI bus, the CPU may enter a low power state (other system conditions may also need to be met).

In various embodiments, a USB device, such as a card reader, may be embedded in a portable computer, such as a laptop. The card reader may read data from memory cards inserted into the card reader. If no memory cards are inserted in the card reader, an algorithm in the card reader's firmware may be implemented to electrically disconnect the card reader from a USB host controller. In some embodiments, when the card reader is electrically disconnected from the USB host controller and no system activity from a bus mastering peripheral is occurring on the PCI bus, the CPU may be allowed to enter a low power state (other conditions may also need to be met). In some embodiments, the card reader may be electrically disconnected or electrically reconnected from the USB host controller by a sideband signal from the computer to signal the card reader when to electrically disconnect and electrically reconnect.

In some embodiments, if a card is inserted into the card reader, but has not been accessed for a first specified amount of time (e.g., 10 seconds), the card reader may power down the card. If the card is then accessed, the card reader may restore power to the card. In some embodiments, an algorithm in the card reader's firmware may power the card up and down. In some embodiments, a sideband signal may be sent to the card reader to signal the card reader to electrically disconnect after the card has been powered down. In some embodiments, the card may be powered down approximately at the same time that the card reader is electrically disconnected. In some embodiments, a sideband signal may be used to signal the card reader when to electrically reconnect.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
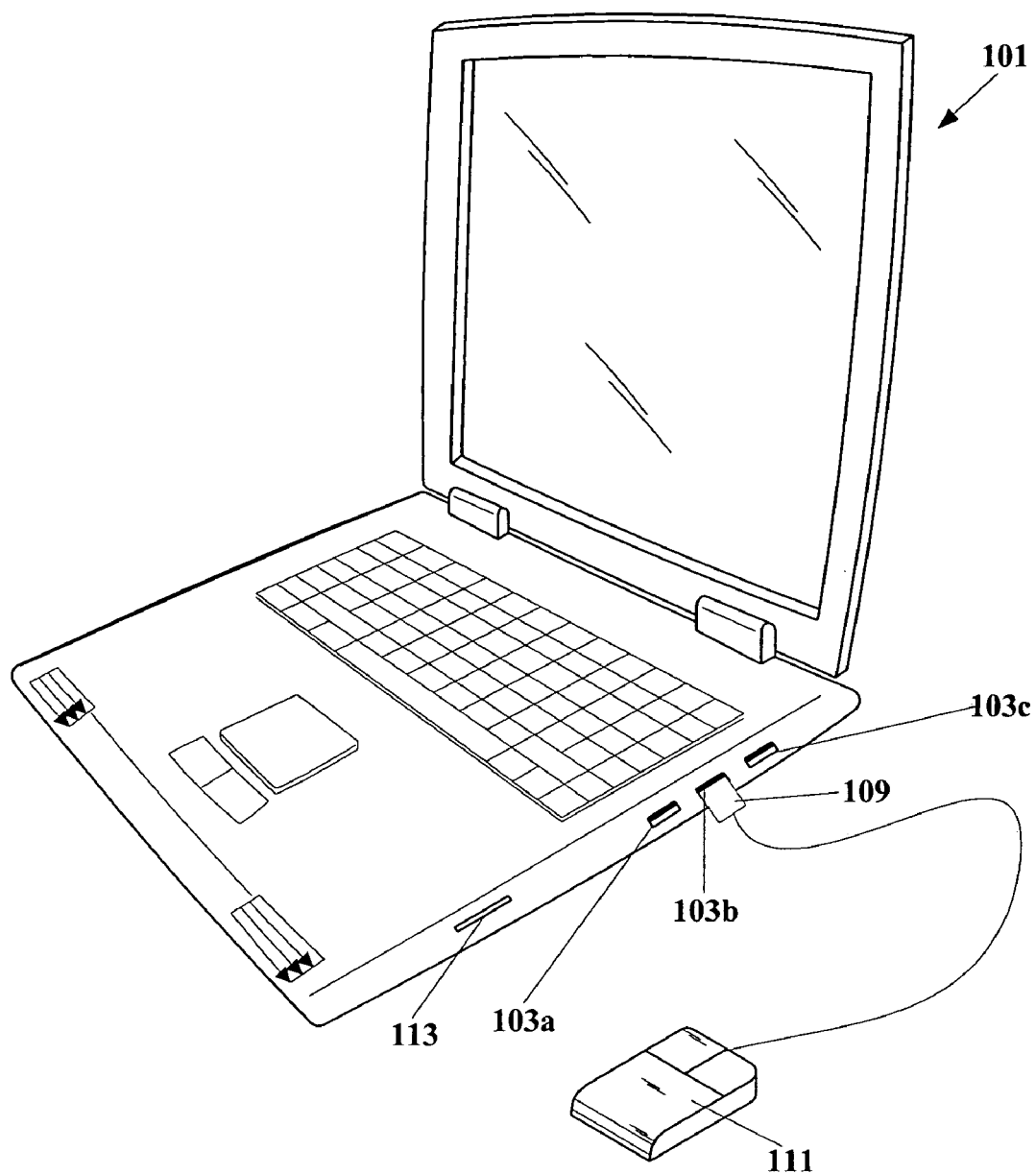
FIG. 1 illustrates a portable computer for various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

FIG. 1 illustrates an embodiment of a portable computer 101 for various embodiments. Embodiments of the invention may be used with various different types of systems of computers, and portable computer 101 is one exemplary embodiment.

In some embodiments, the portable computer 101 may be used with multiple peripheral devices such as, but not limited to, Universal Serial Bus (USB) devices (e.g., computer mouse 111, scanners, printers, external memory devices, cameras, personal digital assistants (PDAs), keyboards, touchscreens, and joysticks). Other peripheral devices are also contemplated.

Figure 2:
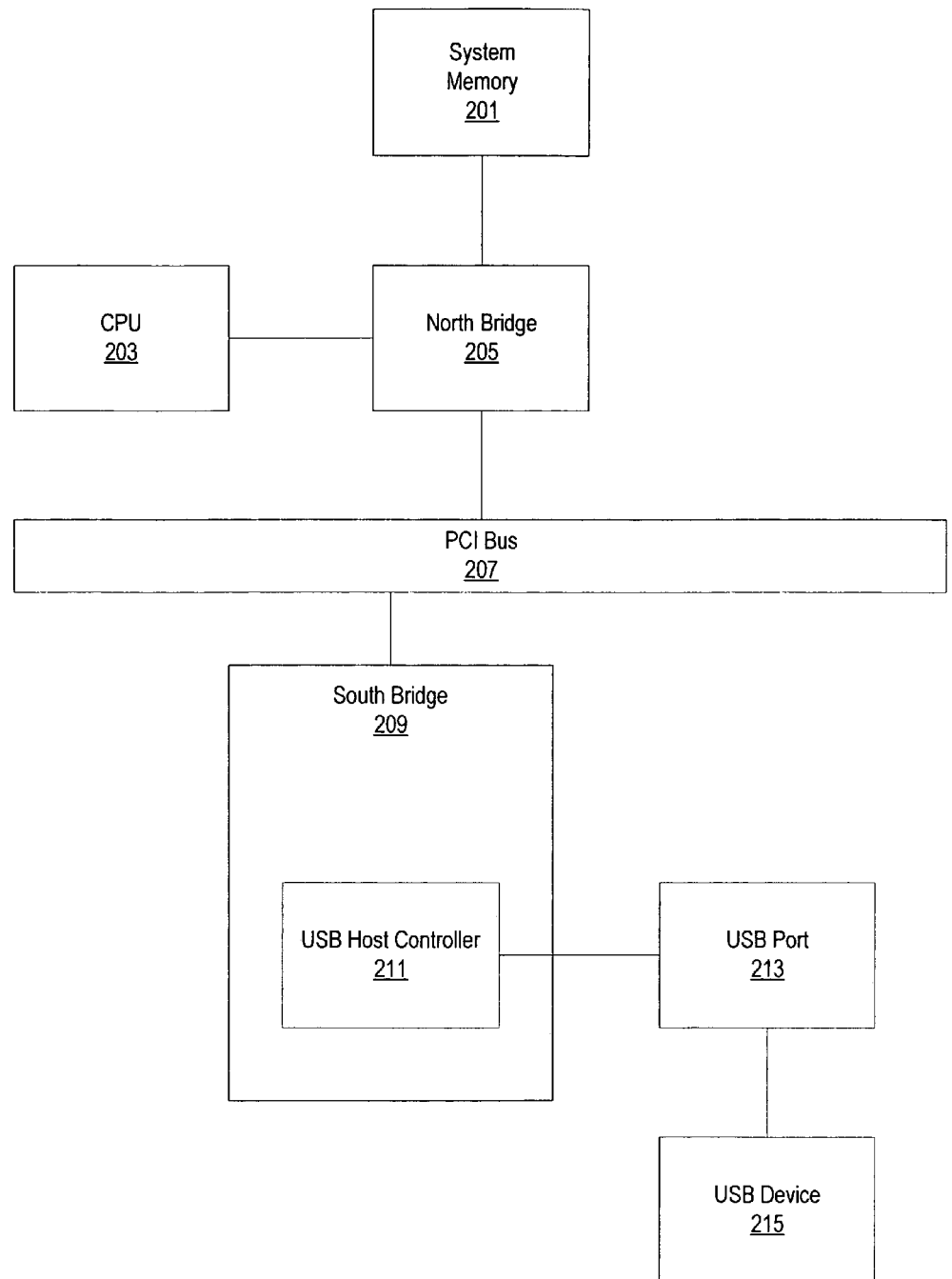
FIG. 2 is a block diagram of one embodiment of a computer, according to an embodiment.

FIG. 2 is a block diagram of one embodiment of computer 101. In some embodiments, north bridge 205 (an integrated chip) couples the central processing unit (CPU) 203 and the system memory 201 to the peripheral component interconnect (PCI) bus 207 (used to connect peripherals to the computer). As shown, south bridge 209 couples to the PCI bus 207. In some embodiments, south bridge 209 may include a USB host controller 211 to communicate through a USB port 213 with a USB device 215. The USB port 213 and USB device 215 may be internal or external to the computer. In some embodiments, the USB host controller 211 may provide a peripheral bus interface between the USB device 215 and the computer.

Referring again to FIG. 1, in some embodiments, USB devices, such as a card reader 113, may communicate with a computer (e.g., portable computer 101) through a USB host controller 211 in a PC chipset. The USB host controller 211 may regulate communication with attached USB devices (e.g., scheduling bandwidth on the bus). Communication speeds with the USB devices coupled to the USB host controller 211 may include low speed (LS), full speed (FS), and high speed (HS). In some embodiments, USB devices may be coupled to a computer (e.g., portable computer 101) through one or more USB ports 103. The USB ports 103 may be on the portable computer 101 or on a docking station (not shown) coupled to the portable computer 101. A USB connector 109 may plug into a USB port 103 to couple a USB device to the portable computer 101.

In some embodiments, a hub (not shown) may be coupled to a USB port 103 of the portable computer 101 to provide additional USB ports. An internal hub may be used to provide multiple. USB ports. For example, an internal hub may provide USB ports 103a, 103b, and 103c. In some embodiments, the hub may be internal to the portable computer 101, while, in some embodiments, the internal hub may be in a docking station for the portable computer 101. Other external hubs may be coupled to one of the USB ports 103 to provide additional USB ports for use. Multiple hubs may be chained together to provide even more USB ports.

In some embodiments, the USB host controller 211 may detect USB devices as they are connected to a USB port 103, interrogate the USB device (e.g., to find out what speed to use for communication with the device and device capabilities), and load a driver to support the USB device. USB devices may communicate with the USB host controller 211 using control, interrupt, bulk, and isochronous transfers. In addition, the USB device may be powered over the USB bus, while some USB devices may be self powered. When a USB device is unplugged from a USB port 103, the USB host controller may detect the absence of the USB device and unload the driver. In some embodiments, a USB hub may not electrically connect to the USB host controller 211 until a device is coupled to the USB hub. In addition, some card readers 113 may not electrically connect to the USB host controller 211 until a card is inserted into the card reader 113.

Figure 3:
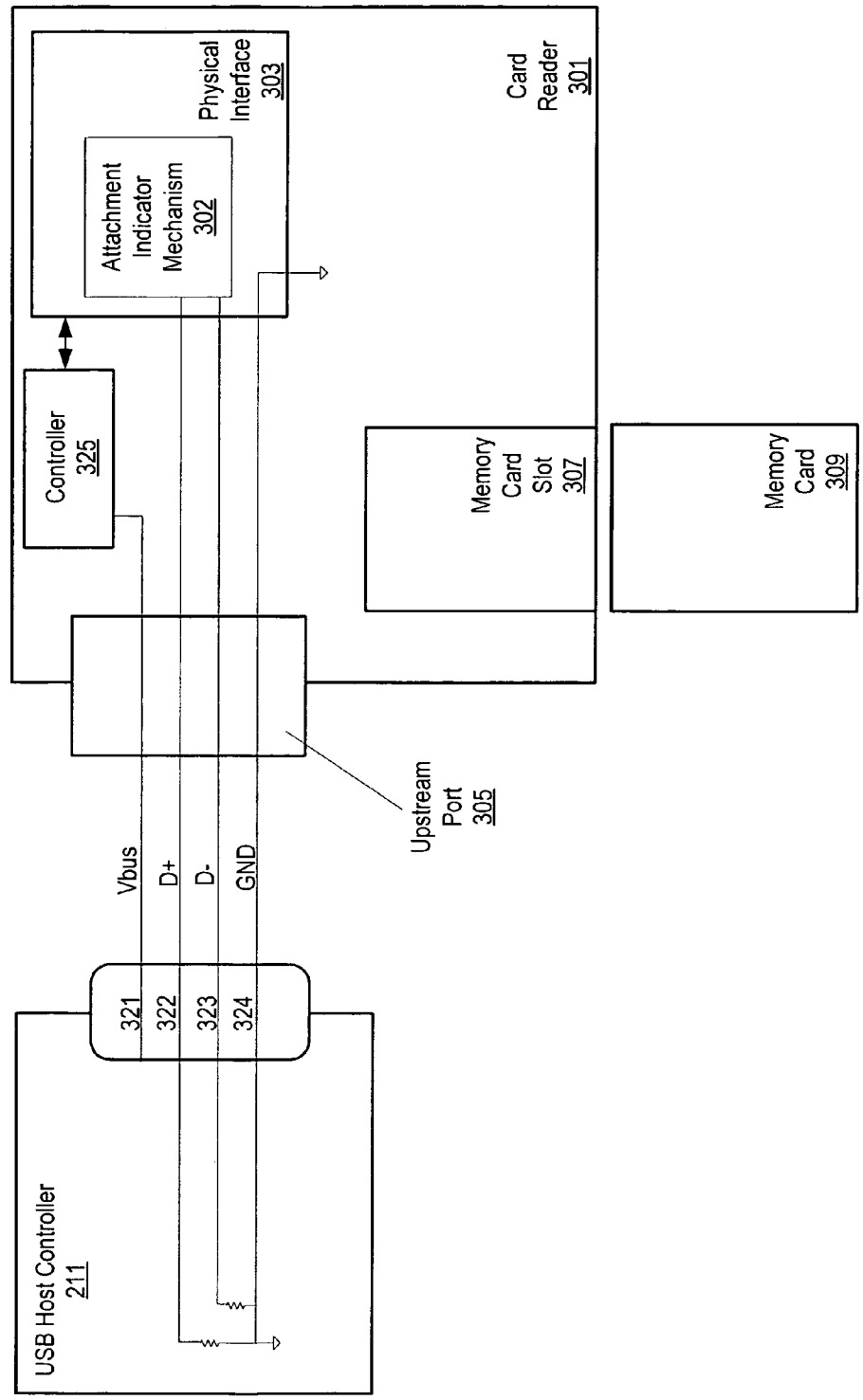
FIG. 3 illustrates a diagram of a card reader coupled to a USB host controller, according to an embodiment.

FIG. 3 illustrates an embodiment of a card reader 301 coupled to a USB host controller 211. In some embodiments, a card reader 301 may be embedded in a computer, such as a portable computer 101. The card reader 301 may communicate with a USB host controller 211 through an upstream port 305. The card reader 301 may use a controller 325 and a physical interface 303 to assist in reading, writing, and transferring data. The memory card 309 may be inserted into the card reader 301 through memory card slot 307. While the card reader 301 is shown with one card slot 307, a card reader 301 with multiple card slots may also be used. In some embodiments, the memory card may be a SmartMedia™ (SM) memory card, xD Picture Cards™ (xD), a Memory Stick™, a High Speed Memory Stick (HSMS), a Memory Stick PRO™ (MSPRO), a Secure Digital (SD) memory card, a MultiMediaMemory™ memory card (MMC), NAND Flash, Compact Flash™ (CF) or a CF form-factor Advanced Technology Attachment (ATA) hard drive. Other memory cards are also contemplated. In various embodiments, a cable between an upstream port 305 and a device (not shown) may carry a power line 321, ground 324, and a pair of data lines 322, 323 (D+ and D−) to transfer data between the card reader 301 and the computer. For full speed card readers, when the card reader 301 is attached to a USB port, the card reader 301 may pull the D+ line 322 high to approximately 3.3 volts using a pull up resistor (not shown) on the D+ line 322. The USB host controller may then detect the presence of the card reader 301 on the bus and reset the card reader 301. High speed devices connect the same way as full speed devices except, during reset, the device, such as a high speed card reader, "chirps" by driving the D− line 323 high. The USB host controller responds by alternately driving the D+ and D− lines high. When the high speed device detects the alternating chirps, the high speed device electrically removes the pull up resistor to balance the line and continues communicating at high speed. In some embodiments, the D+ and D− lines (322,323) may interact with the physical interface 303 through an attachment indicator mechanism 302.

In some embodiments, if no memory card 309 is inserted in the card reader 301 (i.e., the card reader 301 is not in an active state) or the card reader 301 is turned off, an algorithm (e.g., stored in firmware on the card reader 301) may be implemented in the card reader 301 to electrically disconnect the card reader 301 from the USB host controller 211. Firmware may be on a read only memory (ROM) or a programmable read only memory (PROM) accessible by the card reader (e.g., internal or external memory). For example, firmware may be on an Electrically Erasable Programmable Read-Only Memory (EEPROM) that may be externally attached/detached to the card reader to activate/deactivate the electrical disconnect feature. For full speed devices to electrically disconnect, the pull up resistor may be electrically removed (i.e., set to a high impedance or "tri-stated") from the D+ line. The USB host controller may interpret this as a disconnect. To electrically disconnect high speed devices, the D+ and D− lines may both be tri-stated (set to a high impedance).

In some embodiments, when the card reader 301 is electrically disconnected from the USB host controller 211 and no system activity from a bus mastering peripheral is occurring on the PCI bus 207, the CPU 203 may enter a low power state. In some embodiments, if a memory card 309 is in the memory card slot 307, but has not been accessed in a first specified amount of time (e.g., 10 seconds), the memory card 309 may be powered down. In some embodiments, if a sideband signal is available, a sideband signal may be sent to signal the card reader 301 when to electrically disconnect and electrically reconnect. In one embodiment, if the card has not been accessed for a second specified amount of time (e.g., 10 minutes), the card reader 301 may be sent a sideband signal to electrically disconnect from the USB host controller 211. In some embodiments, the card reader 301 may not electrically disconnect from the USB host controller 211 with a memory card 309 inserted unless a sideband signal can be sent to the card reader 301 to signal it to electrically connect when needed. While an embodiment of a card reader 301 is shown in FIG. 3, it is to be understood that other embodiments may include other devices with removable medium. In addition, other devices coupled to the USB host controller 211 may also be electrically disconnected as seen in FIG. 4.

Figure 4:
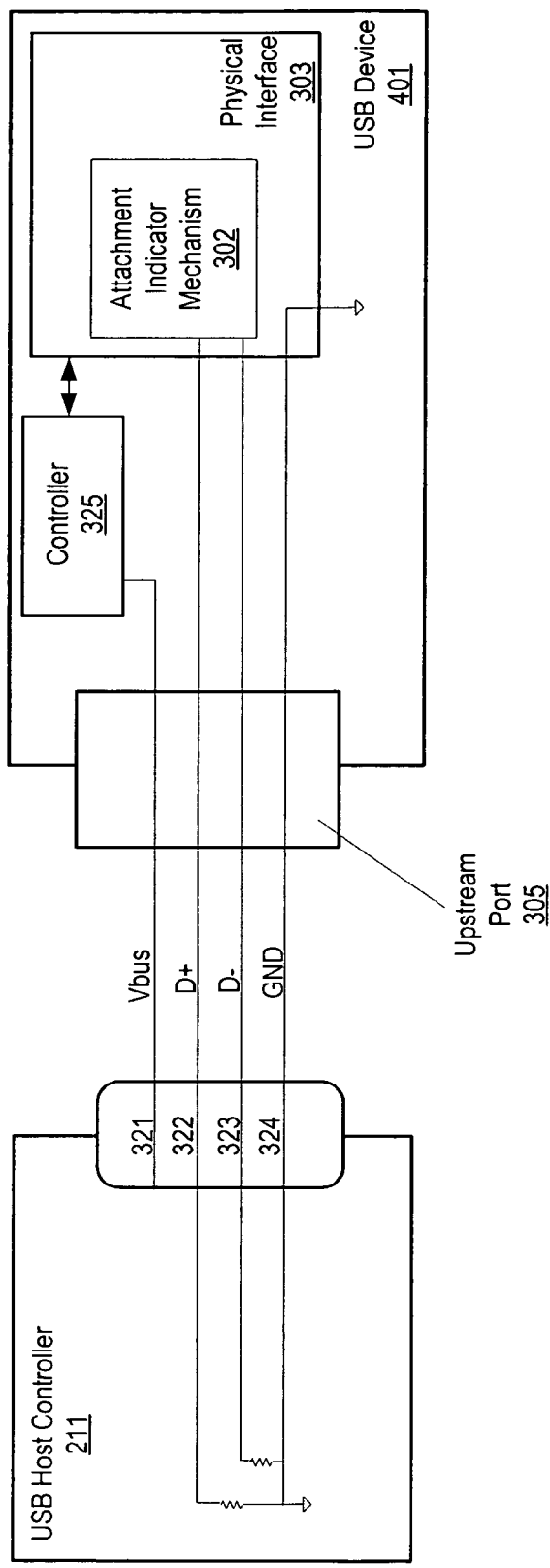
FIG. 4 illustrates a diagram of a USB device coupled to a USB host controller, according to an embodiment.

FIG. 4 illustrates an embodiment of a USB device 401 coupled to a USB host controller 211. In some embodiments, a USB device 401 may be embedded in a computer, such as a portable computer 101. The USB device 401 may communicate with a USB host controller 211 through an upstream port 305. In some embodiments, the USB device 401 may have a controller 325 and a physical interface 303. Data may be transmitted from the USB device 401 to the USB host controller 211 and then used by a CPU 203. In some embodiments, if the USB device 401 is turned off or if the device 401 is not in an active state, an algorithm may be implemented to electrically disconnect the USB device 401 from the USB host controller 211. However, in some embodiments, the USB device 401 may not be electrically disconnected unless the USB device 401 has a way of being signaled to electrically reconnect to the USB host controller (e.g., by inserting a card into a card reader or attaching a device to a USB hub). In some embodiments, if a sideband signal can be used to signal the USB device 401 when to electrically disconnect and when to electrically reconnect, the USB device 401 may be signaled to electrically disconnect if the USB device 401 has not been used in a second specified amount of time (e.g., 10 minutes). A sideband signal may then be used to signal the USB device 401 to electrically reconnect.

In some embodiments, when the USB device 401 is electrically disconnected from the USB host controller 211 and no system activity from a bus mastering peripheral is occurring on the PCI bus 207, the CPU 203 may enter a low power state. In some embodiments, a USB device 401 may be electrically disconnected through a physical interface on the USB device 401. For example, as described above, the physical interface 303 may tri-state (i.e., set to a high impedance) the D+ or the D+ and D− lines (i.e., the FS and HS transceivers) on the USB device 401 and remove any termination from the universal serial bus.

Figure 5:
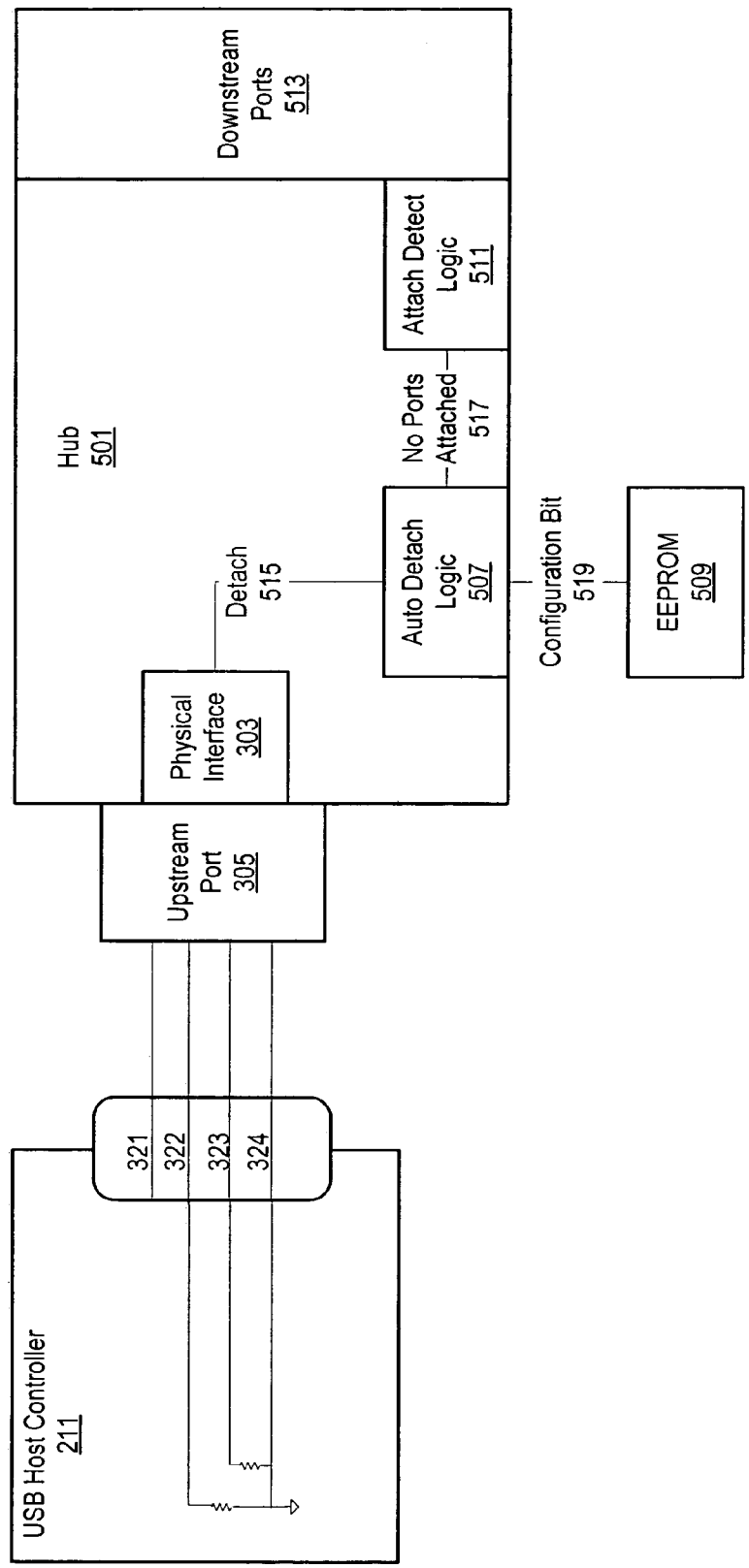
FIG. 5 illustrates a diagram of a hub with an attach detect logic and a physical interface, according to an embodiment.

FIG. 5 illustrates a diagram of an embodiment of a hub 501 with an attach detect logic 511 and a physical interface 303. In some embodiments, a hub 501 may be used to provide multiple downstream ports 513 for USB devices. For example, if hub 501 is internal to the portable computer 101, downstream ports 513 may be provided through USB ports 103 (see FIG. 1). The hub 501 may communicate through an upstream port 305 using a physical interface 303. In some embodiments, the upstream port 305 may be an external USB port (e.g., USB port 103), or, if the hub is internal to the portable computer 101, may be an internal connection to a USB host controller 211. In various embodiments, an attach detect logic 511 may be provided within the hub 501 to detect if a device is coupled to downstream ports 513. An auto detach logic 507 may be activated by a configuration bit loaded from an EEPROM 509. In some embodiments, the auto detach logic 507 may be activated by firmware internal to the hub 501. In some embodiments, if the attach detect logic 511 does not detect a device coupled to the downstream ports 513, a no ports signal 517 may be sent to the auto detach logic 507. The auto detach logic 507 may send a detach signal 515 to the physical interface 303 if the auto detach logic 507 has been configured by a configuration bit 519 from the EEPROM 509 and receives the no ports signal 517 from the attach detect logic 511. In some embodiments, if a device is not coupled to the hub 501, the hub 501 may be electrically disconnected after a wait period. If a device is coupled to the hub 501 during the wait period, the hub may not be electrically disconnected.

In some embodiments, a sideband signal may be used to signal the hub 501 when to electrically disconnect and when to electrically reconnect. The hub 501 may be signaled by a sideband signal from the computer 101 to electrically disconnect if the hub 501 has not been used in a second specified amount of time (e.g., 10 minutes). A sideband signal may then be used to signal the hub 501 to electrically reconnect at a later time. In some embodiments, a sideband signal may be sent to the hub 501 when the computer goes into a SUSPEND mode to signal the hub 501 into a reduced functionality mode in which the hub 501 may only respond to a device trying to activate/wake the computer from SUSPEND mode (e.g., movement from a mouse coupled to the hub 501). The reduced functionality mode, and other modes signaled by the sideband signal, may result in lower power usage from the hub 501.

Figure 6:
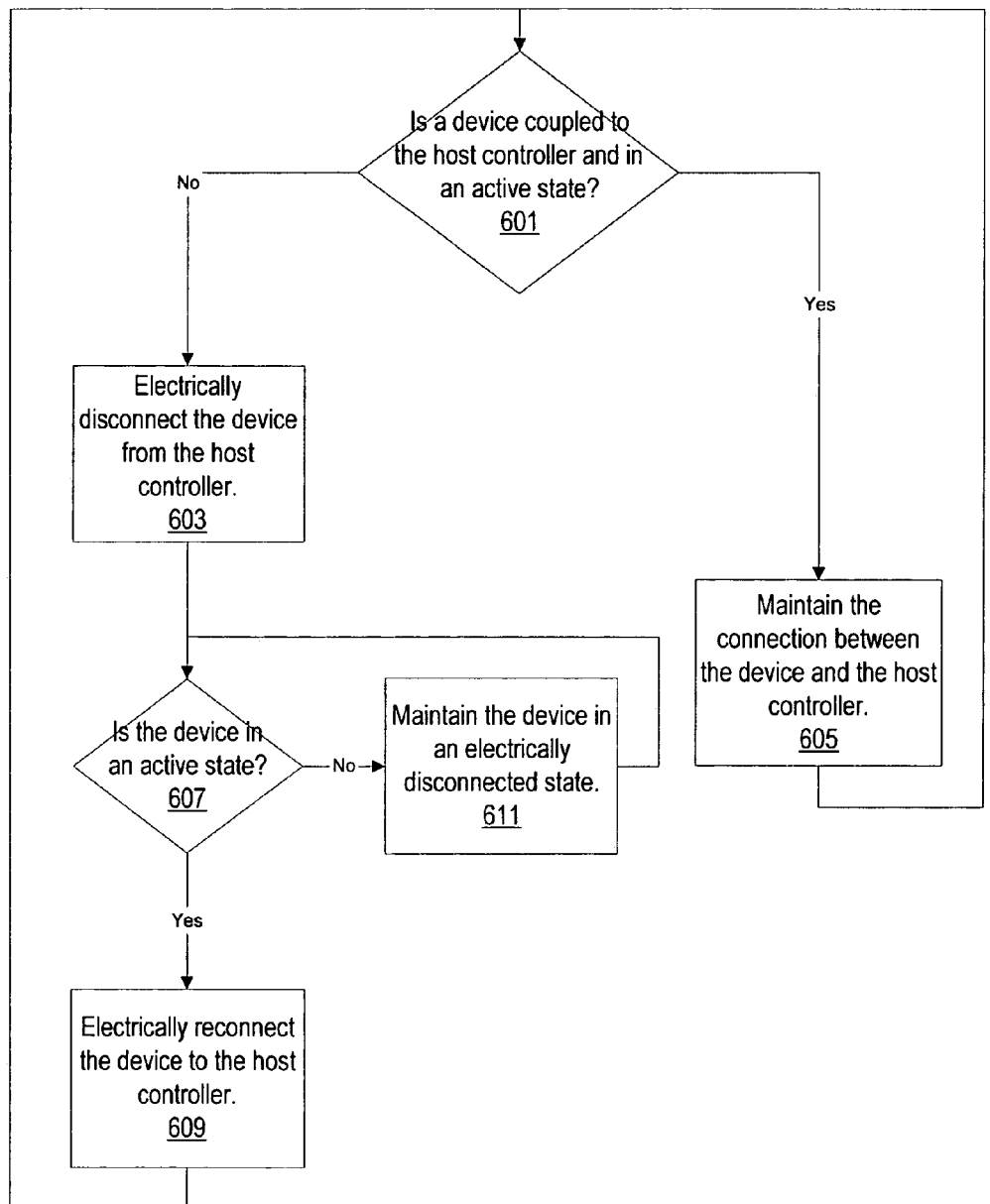
FIG. 6 illustrates a flowchart of a method for electrically disconnecting and electrically reconnecting a device from to a USB host controller, according to an embodiment.

FIG. 6 illustrates a flowchart of an embodiment of a method for electrically disconnecting a device from a USB host controller. It should be noted that in various embodiments of the methods described below, one or more of the steps described may be performed concurrently, in a different order than shown, or may be omitted entirely. Other additional steps may also be performed as desired.

At 601, a determination is made whether a device is coupled to the USB host controller and in an active state. For example, a card in a card reader or a device attached to a USB hub may indicate the card reader and USB hub are in active states.

At 603, if a device is not in an active state, the device may be electrically disconnected from the USB host controller. In some embodiments, if the device is not in an active state, the device may be electrically disconnected after a wait period in case the device becomes active again relatively quickly. If the device becomes active during the wait period (e.g., 2–3 seconds), the device may not be electrically disconnected. Other wait periods are also contemplated (e.g., 1–2 minutes, 10–20 minutes, etc.). In some embodiments, firmware may comprise algorithms to electrically disconnect the device if the device is not in an active state. However, in some embodiments, the USB device may not be electrically disconnected unless the USB device has a way of being signaled to electrically reconnect to the USB host controller (e.g., by a user inserting a card into a card reader, or receiving a sideband signal from the computer).

At 605, if a device is in an active state, an electrical connection between the device and the USB host controller may be maintained.

At 607, if the device enters an active state after the device is electrically disconnected, at 609, the device may be electrically reconnected to the host controller and flow may resume at 601. If the device is not in an active state, at 611, the device may be maintained in an electrically disconnected state and the flow may continue at 607.

Figure 7:
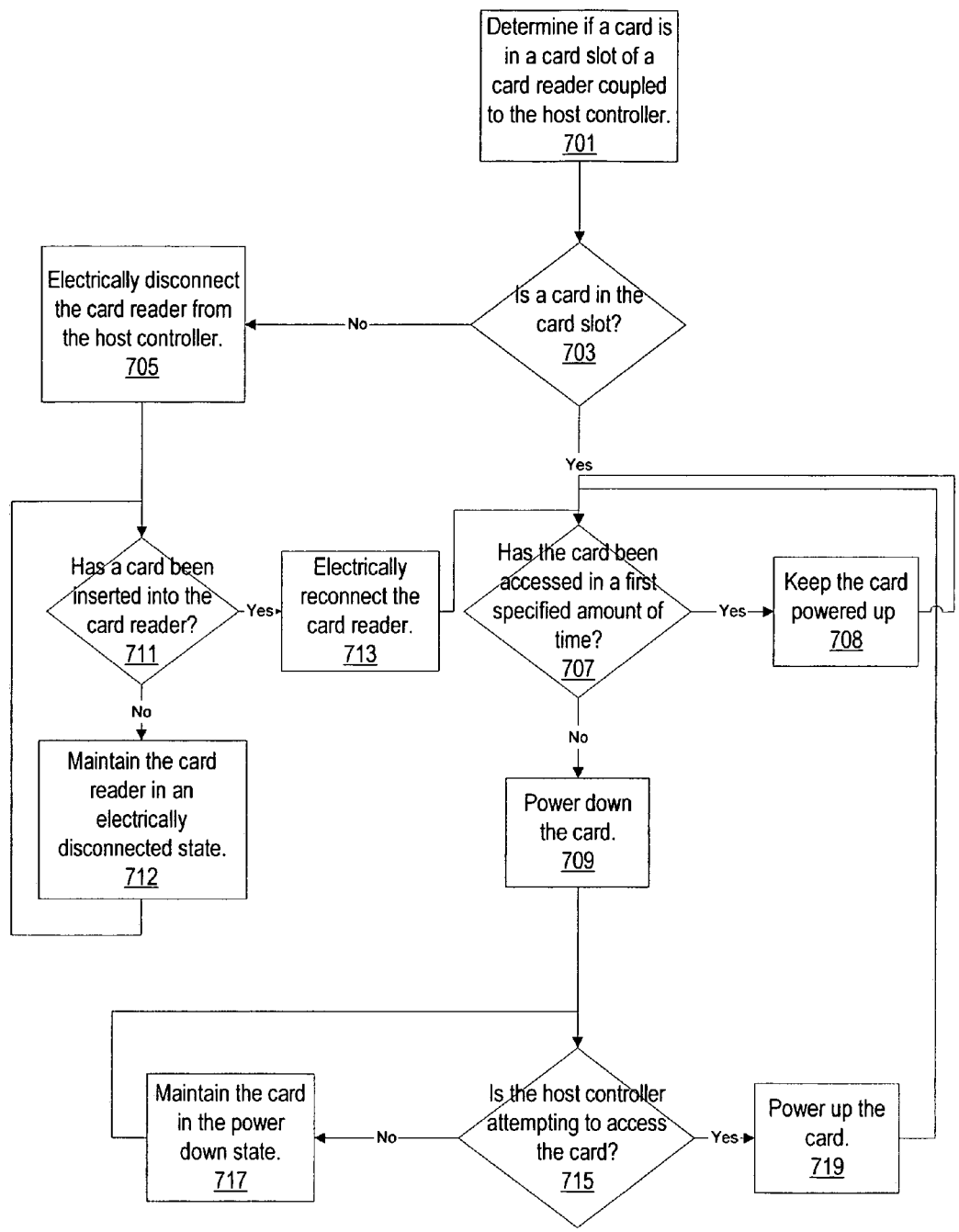
FIG. 7 illustrates a flowchart of a method for electrically disconnecting and electrically reconnecting a card reader to a USB host controller, according to an embodiment.

FIG. 7 illustrates a flowchart of an embodiment of a method for electrically disconnecting a card reader from a USB host controller. It should be noted that in various embodiments of the methods described below, one or more of the steps described may be performed concurrently, in a different order than shown, or may be omitted entirely. Other additional steps may also be performed as desired.

At 701, a determination may be made whether a memory card is in the memory card slot of a card reader coupled to the USB host controller. In other embodiments, a determination may be made as to whether a removable storage medium is in a removable storage medium's reading device.

At 703, if there is no memory card in the memory card slot, at 705, the card reader may be electrically disconnected from the USB host controller. In some embodiments, if the there is no memory card in the card reader, the card reader may be electrically disconnected after a wait period in case the user is switching out cards, etc. If a card is inserted during the wait period (e.g., 2–3 seconds), the card reader may not be electrically disconnected. Other wait periods are also contemplated. In some embodiments, to electrically disconnect the card reader, a physical interface for the card reader may tri-state both FS and HS transmitters on the card reader and remove any termination from the universal serial bus. For example, the D+ line (full speed devices) or the D+ line and the D− line (high speed devices) may be set to a high impedance.

At 707, if there is a memory card in the memory card slot, a determination may be made whether the memory card has been accessed in a first specified amount of time. In some embodiments, the first specified amount of time may be approximately 10 seconds. Other first specified amounts of time are also contemplated.

At 708, if the memory card has been accessed within the first specified amount of time, the card may remain powered up and flow may continue at 707.

At 709, if the memory card has not been accessed within a first specified amount of time, the card may be powered down.

At 715, if the host controller attempts to access the card, at 719, the card may be powered up and the flow may continue at 707.

At 717, if the host controller is not attempting to access the card, the card may be maintained in a power down state and the flow may continue at 715.

At 711, after the card reader has been electrically disconnected from the USB host controller, a determination may be made whether a card has been inserted into the card reader.

At 712, if a card has not been inserted into the card reader, the card reader may be maintained in the electrically disconnected state, and flow may continue at 711.

At 713, if a card has been inserted into the card reader, the card reader may be electrically reconnected and flow may continue at 707.

Figure 8:
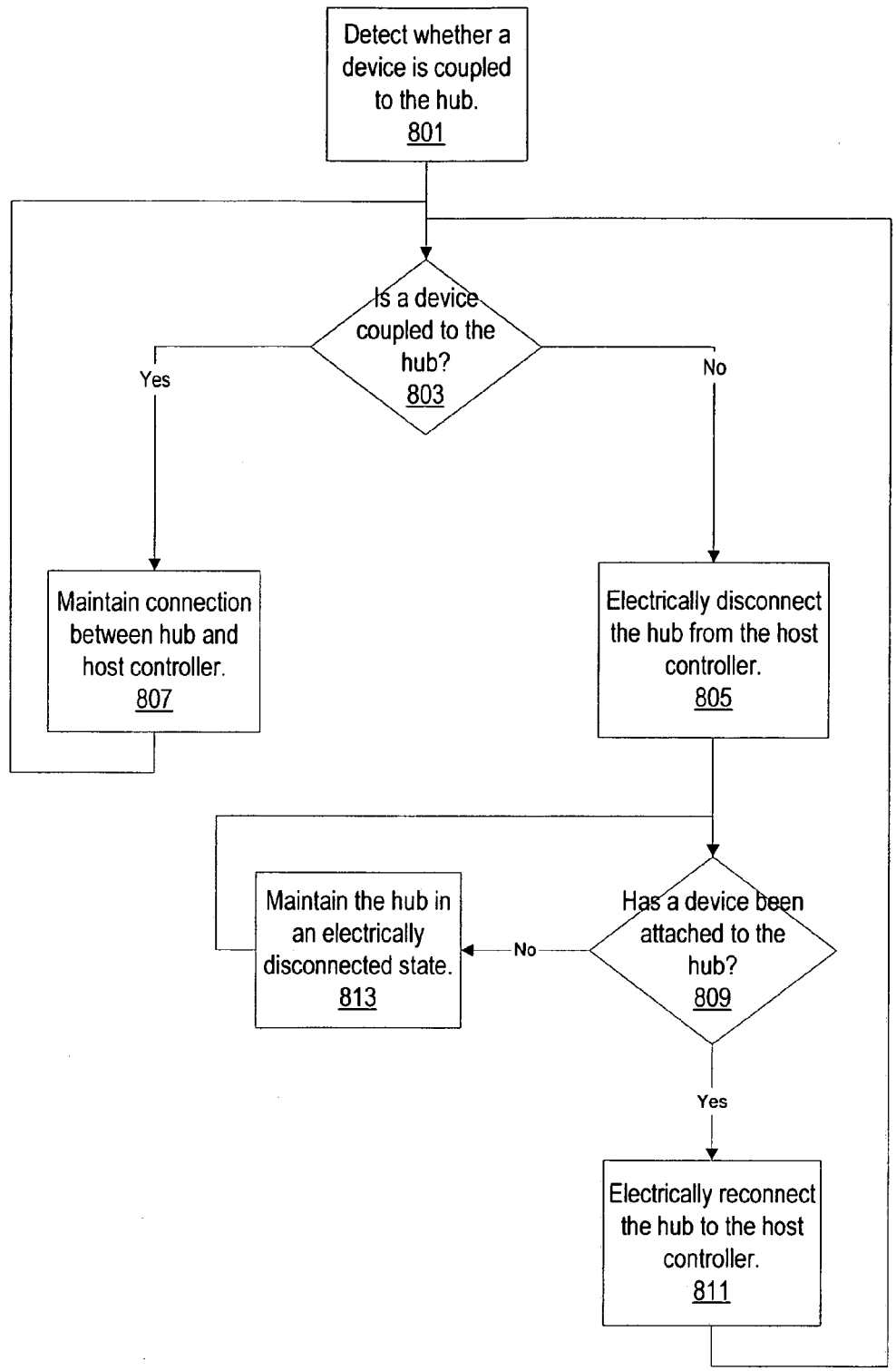
FIG. 8 illustrates a flowchart of a method for electrically disconnecting and electrically reconnecting a hub to a USB host controller, according to an embodiment.

FIG. 8 illustrates a flowchart of an embodiment of a method for electrically disconnecting a hub from a USB host controller. It should be noted that in various embodiments of the methods described below, one or more of the steps described may be performed concurrently, in a different order than shown, or may be omitted entirely. Other additional steps may also be performed as desired.

At 801, a determination may be made whether a device is coupled to the hub. In some embodiments, an attach detect logic may be implemented to detect whether any devices are coupled to the hub.

At 803, if a device is not coupled to the hub, at 805, the hub may be electrically disconnected from the USB host controller. In some embodiments, if a device is not coupled to the hub, the hub may be electrically disconnected after a wait period to give the user time to switch out devices, etc. If a device is coupled to the hub during the wait period, the hub may not be electrically disconnected. In some embodiments, an auto detach logic may be implemented to electrically disconnect the hub from the USB host controller.

At 807, if a device is coupled to the hub, a connection may be maintained between the hub and the USB host controller and flow may continue at 803.

At 809, if a device has been attached to the hub after the hub was electrically disconnected from the USB host controller, at 811, the hub may electrically reconnect to the host controller.

At 813, if a device has not been attached to the hub, the hub may be maintained in an electrically disconnected state and the flow may continue at 809.

Figure 9:
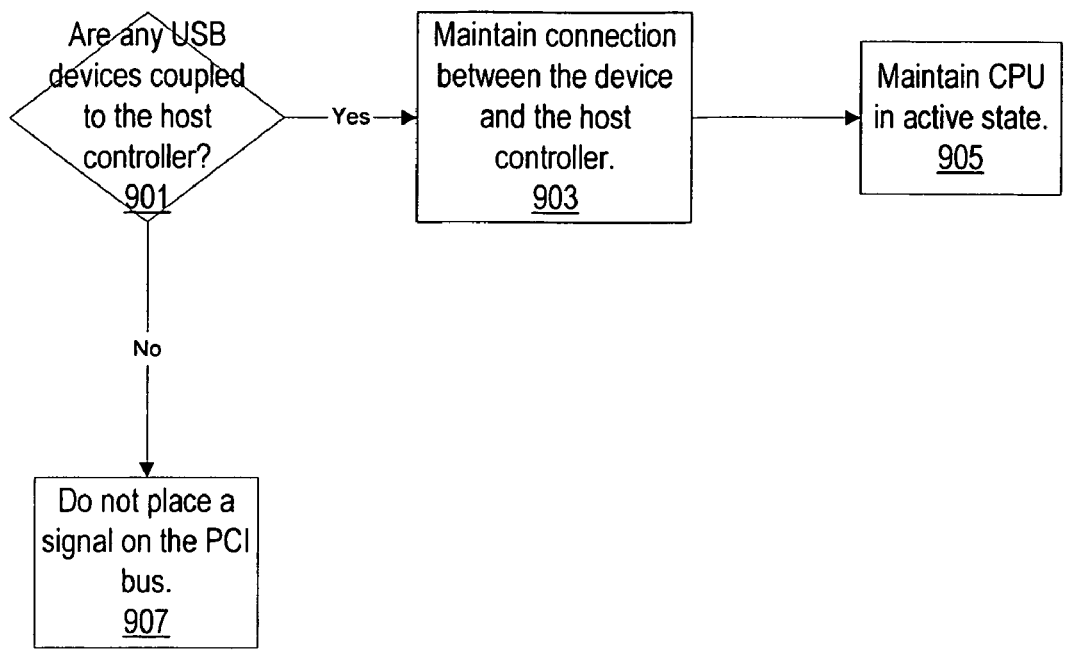
FIG. 9 illustrates a flowchart of a method for regulating the CPU, according to an embodiment.

FIG. 9 illustrates a flowchart of an embodiment of a method for regulating the CPU. It should be noted that in various embodiments of the methods described below, one or more of the steps described may be performed concurrently, in a different order than shown, or may be omitted entirely. Other additional steps may also be performed as desired.

At 901, a determination may be made whether there are any USB devices connected to the USB host controller.

At 903, if there is a device coupled to the USB host controller, a connection between the device and the USB host controller may be maintained, and at 905, the CPU may be maintained in an active state.

At 907, if there are no devices coupled to the USB host controller, the USB host controller may not place a signal on the PCI bus. In some embodiments, if there is no activity on the PCI bus and other conditions for putting the CPU in a low power state are met, the CPU may go into a low power state.

Figure 10:
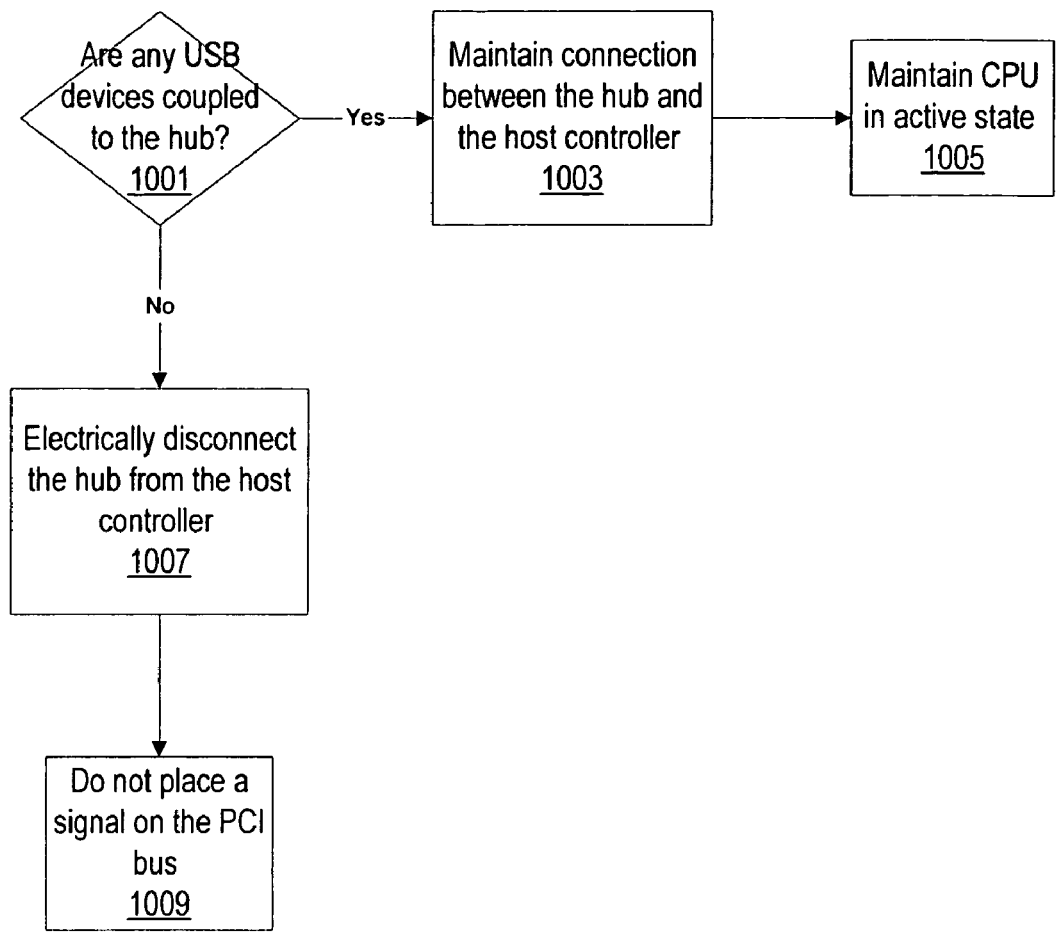
FIG. 10 illustrates a flowchart of a method for regulating a CPU while attached to a hub, according to an embodiment.

FIG. 10 illustrates a flowchart of an embodiment of a method for regulating a CPU while attached to a hub. It should be noted that in various embodiments of the methods described below, one or more of the steps described may be performed concurrently, in a different order than shown, or may be omitted entirely. Other additional steps may also be performed as desired.

At 1001, a determination may be made whether any USB devices are coupled to the hub.

At 1003, if there are USB devices coupled to the hub, a connection may be maintained between the hub and the USB host controller, and at 1005, the CPU may be maintained in the active state.

At 1007, if there are no USB devices coupled to the hub, the hub may electrically disconnect from the USB host controller.

At 1009, the USB host controller may not place a signal on the PCI bus. In some embodiments, if there is no activity on the PCI bus and other conditions for putting the CPU in a low power state are met, the CPU may go into a low power state.

As used herein, a memory medium may include any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. In addition, as used herein, a carrier medium—a memory medium as described above, as well as signals such as electrical, electromagnetic, or digital signals, conveyed via a communication medium such as a bus, network and/or a wireless link. The computer system 101 may include a memory medium(s) on which one or more computer programs or software components according to one embodiment of the present invention may be stored. For example, the memory medium may comprise a read only memory or programmable read only memory such as an EEPROM, or flash memory that stores a software program (e.g., firmware) that is executable to perform the methods described herein. Various embodiments further include receiving or storing instructions and/or data implemented in accordance with the foregoing description upon a carrier medium.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following requests.

I claim:

1. A system, comprising:
a processor;
a host controller coupled to the processor; and
a card reader coupled to the host controller;
wherein the card reader is operable to apply power to a memory card in the card reader; and
wherein the card reader is operable to discontinue applying power to the memory card in the card reader without the processor being powered down, if the memory card has not been accessed in a first specified amount of time.

2. The system of claim 1, wherein the card reader is internal to a computer system housing the processor.

3. The system of claim 1, wherein the card reader is external to a computer system housing the processor.

4. The system of claim 1, wherein the memory card is a flash memory card.

5. The system of claim 1, wherein the first specified amount of time is approximately in a range of 0 to 10 seconds.

6. The system of claim 1, wherein if the memory card is accessed, the system is operable to apply power to the memory card.

7. The system of claim 1, wherein the host controller provides a peripheral bus interface for the card reader.

8. The system of claim 1, wherein the host controller is a universal serial bus (USB) host controller and the card reader is a USB card reader.

9. The system of claim 1, wherein the system is operable to power down the processor if the memory card has not been accessed for a second specified amount of time.

10. A method, comprising:
applying power to a memory card in a card reader coupled to a computer;
detecting whether the memory card has been accessed during a first specified amount of time;
if the memory card has not been accessed during the first specified amount of time, removing power from the memory card, independent from a shutdown process of the computer; and
if the memory card has been accessed during the first specified amount of time, continuing to power the memory card.

11. The method of claim 10, wherein the memory card is a flash memory card.

12. The method of claim 10, wherein the first specified amount of time is approximately in a range of 0 to 10 seconds.

13. The method of claim 10, the method further comprising:
if the memory card is accessed, applying power to the memory card.

14. The method of claim 10, wherein the computer provides a peripheral bus interface for the card reader.

15. The method of claim 10, wherein the computer comprises a universal serial bus (USB) host controller and the card reader is a USB card reader.

16. The method of claim 10, further comprising
if the memory card has not been accessed for a second specified amount of time, powering down the processor.

17. A method, comprising:
applying power to a memory card in a card reader coupled to a computer;
detecting whether the memory card has been accessed during a first specified amount of time;
if the memory card has not been accessed during the first specified amount of time, removing power from the memory card, independent from a shutdown process of the card reader; and
if the memory card has been accessed during the first specified amount of time, continuing to power the memory card.

18. A system, comprising:
a processor;
a host controller coupled to the processor; and
a card reader coupled to the host controller;
wherein the card reader is operable to apply power to a memory card in the card reader; and
wherein the card reader is operable to discontinue applying power to the memory card in the card reader without the card reader being powered down, if the memory card has not been accessed in a first specified amount of time.

19. A card reader, comprising:
a housing; and
one or more slots operable to receive one or more memory cards, wherein the one or more slots are comprised in the housing;
wherein the card reader is operable to apply power to a memory card inserted into a slot of the one or more slots of the card reader; and
wherein the card reader is operable to discontinue applying power to the memory card, independent of a shut down process of a host controller coupled to the card reader, if the memory card has not been accessed in a first specified amount of time.

20. A card reader, comprising:
a housing; and
one or more slots operable to receive one or more memory cards, wherein the one or more slots are comprised in the housing;
wherein the card reader is operable to apply power to a memory card inserted into a slot of the one or more slots of the card reader; and
wherein the card reader is operable to discontinue applying power to the memory card, without a host controller coupled to the card reader being powered down, if the memory card has not been accessed in a first specified amount of time.

* * * * *